United States Patent Office 3,299,708
Patented Jan. 24, 1967

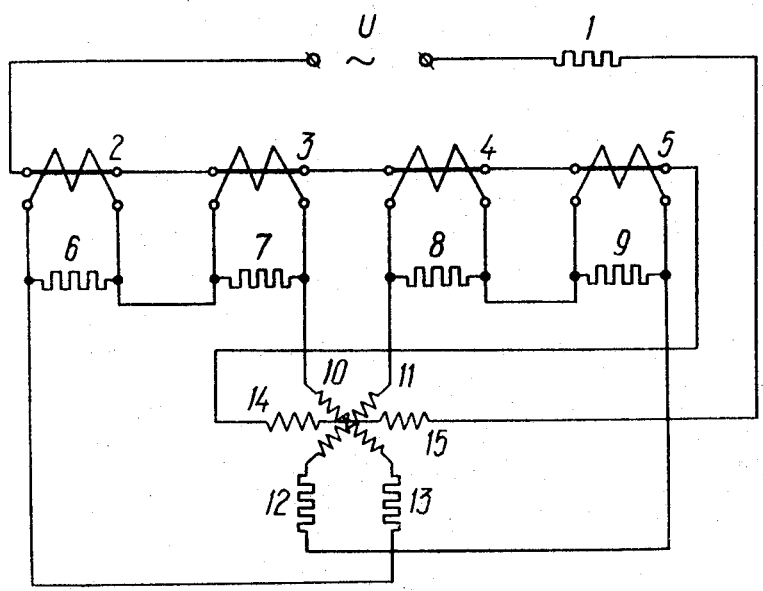

3,299,708
DEVICE FOR MEASURING THE RATIO OF DROPS IN NON-ELECTRIC VALUES, USING RESISTANCE PICKUPS
Vladimir Ivanovich Lakh, Kozaka Str. 16b, Apt. 12; Bogdan Ivanovich Stadnyk, Turgeneva Str. 15, Apt. 1; and Ivan Filippovich Paljanytsa, Zavodskaja Str. 40, Apt. 11; all of L'vov, U.S.S.R.
Filed Mar. 4, 1964, Ser. No. 349,343
6 Claims. (Cl. 73—342)

This invention relates to apparatus for measuring and indicating the ratio of two differences between non-electric quantities, such as, for example, temperature.

In some branches of industry, e.g. in atomic energy and rocketry, it is necessary to know or have an indication of the ratio of two non-electric differentials and, previously, such a ratio has been determined either by calculation after measuring independently the two differences, or by employing a computer.

With the first method, some time is taken to calculate the ratio from the measured differences and this time delay may result in incorrect information being obtained on the state of a process under examination. Alternatively, the second method has the disadvantage of requiring a complicated and expensive computing unit.

An object of the present invention is to provide a simple apparatus for direct measurement of the ratio of two differences between non-electric quantities, in which these disadvantages are eliminated.

According to the present invention, apparatus for measuring and indicating the ratio of two differences between non-electric quantities comprises a plurality of current transformers with their primaries in series and supplied from an A.C. source and their secondaries interconnected in series-opposition in pairs, a plurality of resistance type transducers measuring non-electric variables and connected respectively one to each of the secondaries of the transformers so that each pair of series-opposed secondaries in combination with a respective pair of transducers will produce an output voltage signal proportional to a particular non-electric difference, and means responsive to the ratio of the output voltage signal.

One embodiment of the present invention is illustrated with reference to the accompanying drawing in which the sole figure is a schematic diagram of the circuit of said embodiment.

In the apparatus shown, primaries of four current transformers 2, 3, 4, 5 are in series and supplied from an A.C. source via a ballast resistor 1 which acts to limit the current in the circuit.

Secondaries of transformers 2, 3 and secondaries of transformers 4, 5 are in series-opposition, respectively.

Resistance type transducers (e.g. resistance thermometers) 6, 7, 8, 9 are connected respectively one to each of the secondaries of transformers 2, 3, 4, 5 thus making pairs of series-opposed secondaries in conjunction with respective transducer pairs which produce voltage signals proportional to differences in value between non-electric quantities as measured by transducer pairs 6, 7 and 8, 9 at their proper stations.

Output voltage signals from these two pairs of transformer secondaries are applied to the movable coils 10, 11 of a suitable electrodynamic ratiometer which will give direct indications of the value of the ratio of the voltage signals and, hence, of the non-electric differences.

Resistors designated as 12, 13 are used to match impedance of the ratiometer.

Fixed coils 14, 15 of the ratiometer are supplied from an A.C. source and are in series with the transformer primaries to compensate for the effect of supply voltage fluctuations on measurement results.

Errors caused by a phase shift of the transformer voltages are negligible since the transformer mode of operation is close to short-circuiting so that the phase shift between the primary and second currents is near to 180°.

Various modifications are possible within the scope of the present invention. For example, it will be easily understood that resistance type transducers can be used to measure non-electric quantities other than temperature.

What is claimed is:

1. Apparatus for measuring and indicating the ratio of two differences between non-electric quantities comprising a plurality of current transformers including primaries coupled in series and secondaries interconnected in series-opposition in pairs, an A.C. source connected in series with said primaries, a plurality of resistance type transducers measuring a non-electric quantity and connected respectively in parallel with each of the secondaries of said transformers to produce output voltage signals proportional respectively one to each of the two non-electric differences, and means responsive to the ratio of said voltage signals.

2. Apparatus according to claim 1 wherein transducers are connected in pairs to respective pairs of series-opposed secondaries so that each pair of series-opposed secondaries in conjunction with respective pairs of transducers will produce an output voltage signal proportional to a particular non-electric difference.

3. Apparatus according to claim 2 comprising a ratiometer including fixed and movable coils and wherein the output voltage signals from said transformer secondaries are applied to the movable coils of said ratiometer while the fixed coils are in series with the transformer primaries and supplied from said A.C. source.

4. Apparatus according to claim 2 wherein the voltage produced by a single pair of transformer secondaries and proportional to the difference of non-electric quantities is applied to an instrument responsive to this voltage.

5. Apparatus according to claim 2 wherein the voltage produced by each pair of transformer secondaries and proportional to the differences between non-electric quantities is applied to an instrument reproducing their product.

6. Apparatus according to claim 2 wherein the voltages produced by two separate transformer secondaries and proportional to the values of non-electric quantities is applied to an instrument responsive to their product or ratio.

References Cited by the Examiner
UNITED STATES PATENTS

| | | | |
|---|---|---|---|
| 1,956,386 | 4/1939 | Gruss | 73—341 X |
| 2,206,715 | 7/1940 | Burat et al. | 73—342 X |
| 2,398,606 | 4/1946 | Wang | 73—341 X |

FOREIGN PATENTS

| | | |
|---|---|---|
| 659,487 | 5/1938 | Germany. |
| 1,033,733 | 11/1956 | Germany. |
| 457,111 | 11/1936 | Great Britain. |

LOUIS R. PRINCE, *Primary Examiner.*
D. McGIEHAN, *Assistant Examiner.*